United States Patent [19]
Cantoni

[11] Patent Number: 4,890,463
[45] Date of Patent: Jan. 2, 1990

[54] ABSORPTION-TYPE REFRIGERATION SYSTEM WITH THERMAL ENERGY RECOVERY, PARTICULARLY FOR VEHICLES PROVIDED WITH AN INTERNAL COMBUSTION ENGINE

[75] Inventor: Angelo Cantoni, Rome, Italy

[73] Assignee: Ital Idee s.r.l., An Italian Limited Liability Company, Rome, Italy

[21] Appl. No.: 120,784

[22] Filed: Nov. 16, 1987

Related U.S. Application Data

[63] Continuation-in-part of Ser. No. 860,021, May 6, 1986, abandoned.

[30] Foreign Application Priority Data

May 13, 1985 [IT]  Italy .............................. 48073 A/85

[51] Int. Cl.⁴ ............................................. F25B 27/00
[52] U.S. Cl. .................................... 62/238.3; 62/239; 62/476; 62/480
[58] Field of Search ................................. 62/477, 79

[56] References Cited

U.S. PATENT DOCUMENTS

| | | |
|---|---|---|
| 2,107,320 | 2/1938 | Zellhoefer . |
| 2,307,947 | 1/1943 | Payne . |
| 2,408,802 | 10/1946 | Miller . |
| 2,990,694 | 7/1961 | Kummerlowe . |
| 3,505,810 | 4/1970 | Mamiya .............. 62/238.3 |
| 4,270,365 | 6/1981 | Sampietro . |
| 4,341,088 | 7/1982 | Mei et al. . |
| 4,380,909 | 4/1983 | Sung .................. 62/238.3 |
| 4,532,778 | 8/1985 | Clark et al. ........... 62/238.3 |

FOREIGN PATENT DOCUMENTS

| | | |
|---|---|---|
| 0082018 | 6/1983 | European Pat. Off. . |
| 2756348 | 6/1979 | Fed. Rep. of Germany . |
| 3207243 | 11/1982 | Fed. Rep. of Germany . |
| 1395744 | 3/1965 | France . |
| 2061500 | 6/1971 | France . |
| 2201660 | 4/1974 | France . |

OTHER PUBLICATIONS

Prof. Dr. Ing. W. Niebergall, Absorptions-Kalteanlagen Fur Industrielle Klimatisierung, Chemiefasorn und Klimatechnik, vol. 12, nr. 10, Oct. 1962. pp. 696–704.

Primary Examiner—Henry A. Bennet
Attorney, Agent, or Firm—Fleit, Jacobson, Cohn, Price, Holman & Stern

[57] ABSTRACT

The refrigeration system of the invention comprises a vapor generator member connected to a condenser which is itself connected, by way of a pressure reduction valve, to an evaporator connected to an absorber which receives the liquid present in the lower zone of the generator and from which liquid is fed to the upper zone of the generator, there being provided in the generator a heat exchanger through which the engine cooling liquid flows, the generator member and absorber member containing a refrigerant fluid and an absorbent fluid, the absorbent fluid being able to absorb or dissolve the refrigerant fluid, which can itself be distilled or separated from the absorbent fluid by the addition of heat which is supplied to the generator by the heat exchanger present in it, and be condensed and vaporized under the temperature and pressure conditions prevailing in the condenser and evaporator respectively.

14 Claims, 4 Drawing Sheets

ABSORPTION-TYPE REFRIGERATION SYSTEM WITH THERMAL ENERGY RECOVERY, PARTICULARLY FOR VEHICLES PROVIDED WITH AN INTERNAL COMBUSTION ENGINE

This application is a continuation-in-part division, of application Ser. No. 860,021, filed May 6, 1986, now abandoned.

BACKGROUND OF THE INVENTION

The present invention relates to an absorption-type refrigeration system with thermal energy recovery, particularly for vehicles provided with an internal combustion engine.

In order to cool the air for example in vehicle passenger compartments and the like, air-conditioning apparatus are used which operate on a thermodynamic heat transfer cycle using energy.

Usually, such air-conditioning apparatus employ a refrigeration system comprising a compressor which draws in a refrigerant fluid from an evaporator in which the fluid absorbs heat from the external environment, and compresses it to a pressure at which its boiling point exceeds the temperature of the water and air which receive the heat expelled by the circuit in a condenser, this latter being connected to the evaporator through a pressure reduction valve which causes the fluid to undergo the required pressure drop.

However, the operation of the compressor requires a considerable absorption of mechanical energy, so substantially penalising the engine and the vehicle performance, this operation moreover having to be effected through transmission members which often present constructional or operational difficulties.

Furthermore, the systems of the described type operate under high pressure conditions, and the heat exchangers used by them are therefore of considerable weight and complex construction.

There is a further cooling requirement in the case of supercharged engines, in which a substantial efficiency increase is obtained if the compressed combustion air is at low temperature.

There is therefore a requirement for a cooling system which can be used both for the internal air-conditioning of the vehicle and for cooling the engine supercharging air, and which is operated by a member which works by recovering the thermal energy dissipated by the engine without penalising the engine performance, the operation being at low pressure with the result that heat exchangers of reduced weight and cost are sufficient.

Accordingly, a primary purpose of this invention is to provide a new and improved absorption-type refrigeration system which accomplishes that purpose.

In this regard, prior known air conditioning apparatus and/or refrigerators of the absorption-type require great volumes for a vapour generator and for an absorber, with respect to the remainder of the circuit, for correct operation of the system. Accordingly, if a prior known absorption-type air conditioner or refrigerator is subjected to continuous movements, the large quantities of liquid contained in the generator and absorber are subjected to shaking as a result of movements of the air conditioning or refrigerator system. As a consequence of this shaking, a part of the absorbing fluid starts to circulate in the circuit designed for the refrigerating fluid, and vice versa, with a consequent inversion of the system operation cycle. Thus, conventional absorption-type air conditioning apparatus and refrigerators must operate in the absence of movements, and can not be installed aboard a motor vehicle, because a vehicle, when in motion, is subjected to various movements, such as transversal accelerations (centrifugal force in curves), longitudinal accelerations (acceleration and braking in a straight course) and vertical accelerations (slope changes and bumps in the road). Accordingly, a primary purpose of this invention, as noted previously, is to provide a new and improved absorption-type air conditioning or refrigeration system, which overcomes these problems and which can be used in a motor vehicle.

SUMMARY OF THE INVENTION

These results are attained according to the present invention by an absorption-type refrigeration system with thermal energy recovery, particularly for vehicles provided with an internal combustion engine, which comprises a vapour generator member connected to a condenser which is itself connected, by way of a pressure reduction valve, to an evaporator connected to an absorber which receives the liquid present in the lower zone of the generator and from which liquid is fed to the upper zone of the generator, there being provided in the generator a heat exchanger through which the engine cooling fluid flows, the generator member and absorber member containing a refrigerant fluid and an absorbent fluid, there being provided in the absorber and generator a means, such as sponge-like material, for precluding undesirable circulation of absorbent fluid in the refrigerant fluid circuit, and vice versa, and the absorbent fluid being able to absorb or dissolve the refrigerant fluid, which can itself be distilled or separated from the absorbent fluid by the addition of heat which is supplied to the generator by the heat exchanger present in it, and be condensed and vaporised under the temperature and pressure conditions prevailing in the condenser and evaporator respectively.

In particular, the vapour generator member comprises a vertical vessel which contains a heat exchanger traversed by the engine cooling fluid and means (e.g.) sponge-like material providing a large mass transfer surface, and from the upper part of which a pipe feeds the vapour generated in it by distillation of the mixture or solution of refrigerant fluid and absorbent fluid to the condenser, whereas from the lower part of the vessel a pipe provided with a pressure reduction valve feeds the liquid to the absorber member, there being also provided means for distributing liquid originating from the absorber member over the heat exchanger.

The absorber member comprises a coil which is connected to a pipe originating from the evaporator and leads to a collection receiver, there also opening into the coil the pipe which feeds liquid from the lower part of the vapour generator, there being provided in the lower zone of the collection receiver a pipe which by means of a pump controlled by means for sensing the liquid level in the generator feeds the liquid contained in the receiver to the means for distributing the liquid over the heat exchanger in the vapour generator, there being also provided in the upper part of the vessel a connector provided with a valve for the introduction of the fluids and for the production and maintenance of the internal operating pressure.

The means providing a large mass transfer surface in the vapour generator may consist of a filling of low-density sponge material provided in the upper part of the vessel and a filling of high-density sponge material provided in the lower part of the vessel.

According to one embodiment of the invention, the heat exchanger present in the vapour generator can be in the form of a coil through which the vehicle engine cooling liquid flows and which is immersed in a filling of very high-density sponge material. Alternatively, the heat exchanger can consist of a tube bundle comprising vertical tubes which is contained in the vessel, the solution or mixture of absorbent fluid and refrigerant fluid passing through the inside of the tubes, while the engine cooling liquid passes around the outside of the tubes.

In a further embodiment of the invention, the evaporator consists of a heat exchanger operated by an electrically driven fan and disposed in the duct which feeds air to the interior of the vehicle passenger compartment, there being connected into the pipe leaving the generator and leading to the condenser a three-way valve which can be controlled from the vehicle interior in order to feed the vapour generated in the generator to the evaporator downstream of the pressure reduction valve. Conveniently, in this case the evaporator is the actual existing heat exchanger for the internal heating of the vehicle passenger compartment.

In an alternative embodiment of the invention, the evaporator can consist of a heat exchanger disposed in the combustion air intake duct of a supercharged engine, upstream of the compressor, in order to cool the intake air so increasing the compression efficiency.

The mixture or solution of absorbent fluid and refrigerant fluid consists preferably of a solution of LiBr in water, $NH_3$ in water, or a solution of $NH_3$, $H_2O$ and $H_2$.

The vapour generator is provided in its lower zone with a liquid level sensor acting on a valve for controlling the flow of engine cooling liquid through the heat exchanger present in the generator.

If the refrigeration system is used for the internal airconditioning of the vehicle, the evaporator is provided with a temperature sensor acting on the valve which controls the flow of engine cooling liquid through the heat exchanger present in the generator, in order to prevent the formation of ice on the evaporator heat transfer surface.

If the refrigeration system is used for cooling the combustion air of a supercharged engine, a temperature sensor is provided in the combustion air intake duct upstream of the heat exchanger, to act on the valve controlling the engine cooling liquid flow through the heat exchanger present in the generator, in order to control the cooling as a function of the external air temperature.

DESCRIPTION OF THE DRAWINGS

Further details will be more apparent from the description given hereinafter with reference to the accompanying drawings in which.

DETAILED DESCRIPTION

Figure 1:
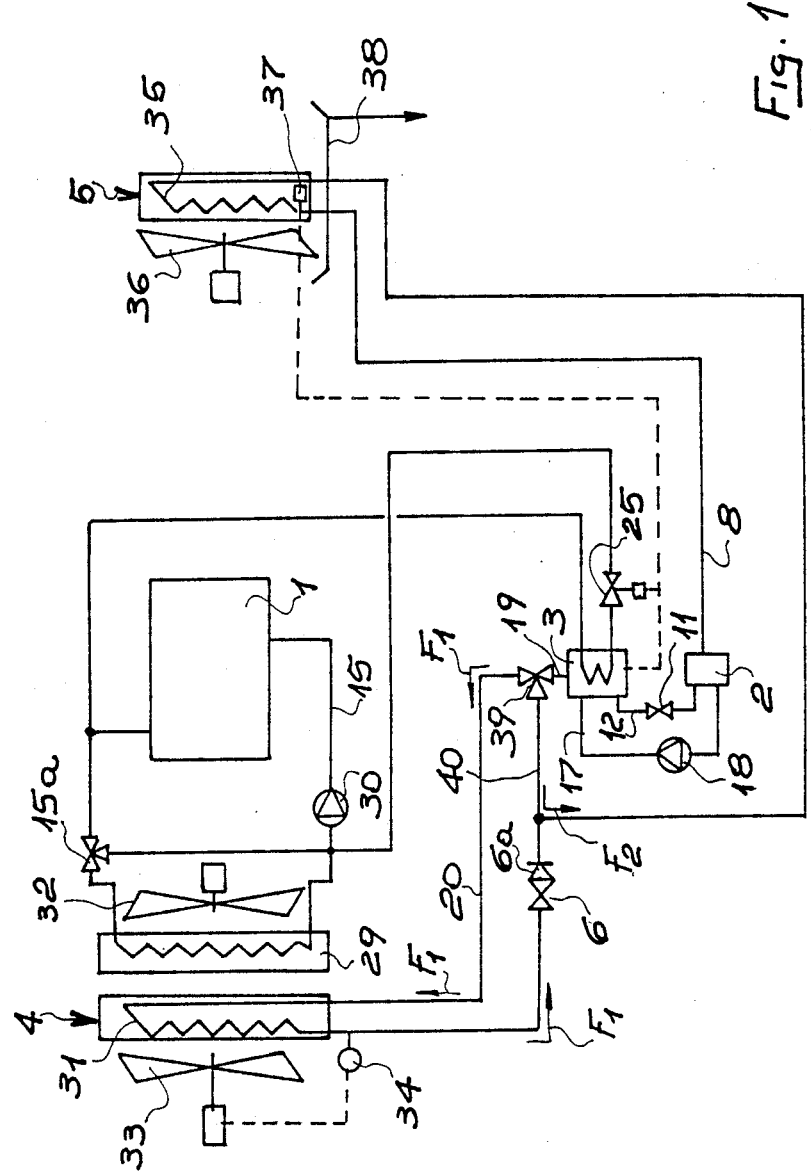
FIG. 1 is a circuit diagram of the refrigeration system according to the invention used for cooling the air of a vehicle passenger compartment.

As can be seen in FIG. 1, the refrigeration system according to the invention, as applied to an internal combustion engine 1, comprises an absorber 2 and a vapour generator 3, which are connected to a condenser 4 and evaporator 5, and further comprises a pressure reduction valve 6 and a non-return valve 6a.

Figure 2:
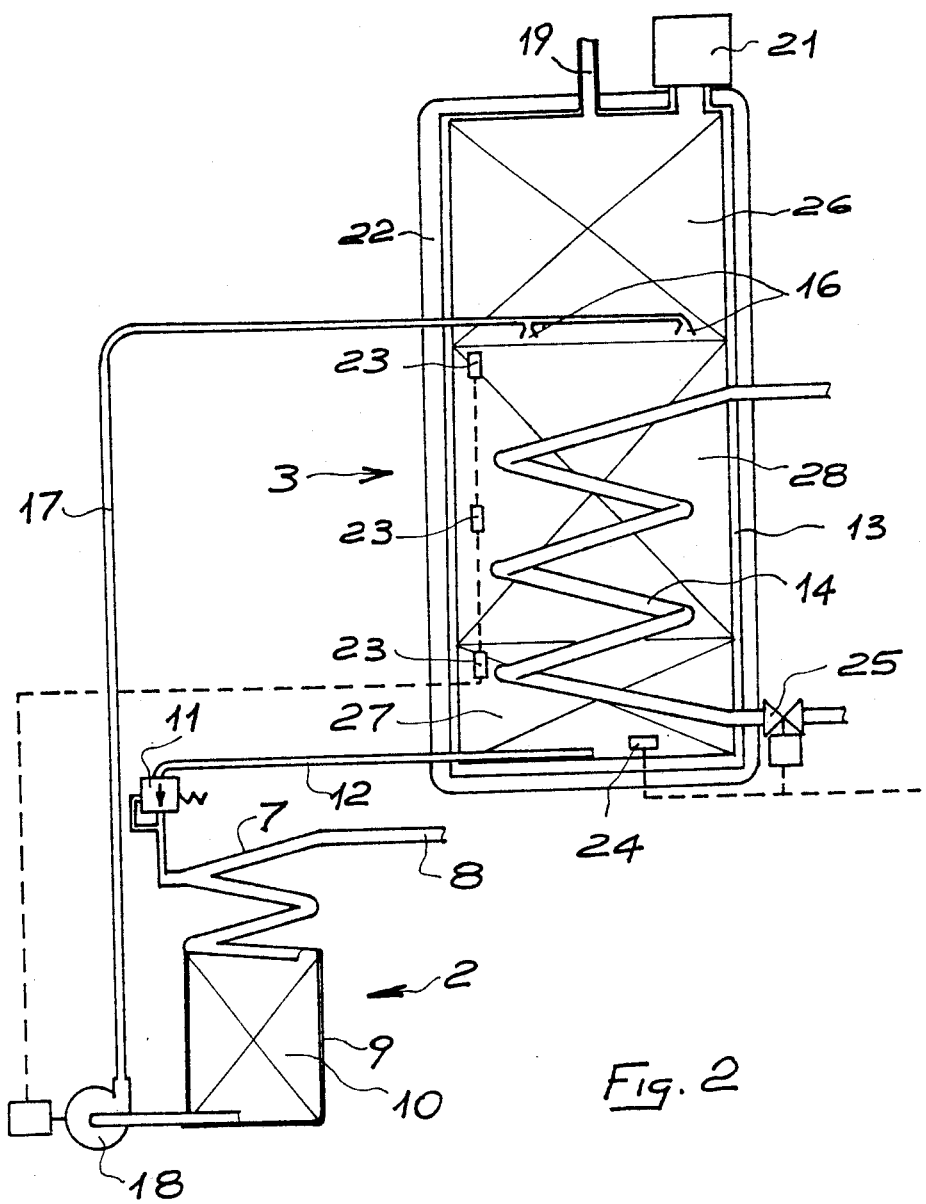
FIG. 2 is a detailed view of the vapour generator member and absorber member.

Considering the invention in greater detail and referring also to FIG. 2, the absorber 2 comprises a coil 7 which is connected to the pipe 8 originating from the evaporator 5, and opens into a receiver 9 internally comprising a porous sponge-like material filling 10 the purpose of which is to fractionate the liquid mass present in order to reduce its dynamic stresses without substantial volume reduction.

A pipe 12 originating from the generator 3 is also connected into the coil 7, by way of a pressure regulating valve 11.

In the embodiment shown in FIG. 2, the generator 3 consists of a vessel 13 of vertical axis, in which a coil 14 is provided connected to the normal cooling liquid circuit 15 of the engine 1, and provided with the thermostatic valve 15a for temperature control. Spray nozzles 16 open into the vessel 13 and are fed via the pipe 17 by a pump 18 which draws solution from the lower part of the receiver 9 of the absorber 2.

The vapour pipe or conduit 19, connected to the vapour pipe or line 20 leading to the condenser 4, emerges from the top of the vessel 13, in which there is provided a valve 21 for feeding the process fluids to the system and for applying the necessary vacuum to it for operation. Insulation 22 is provided on the outside of the vessel 13.

In the vessel 13 there are three electrical sensors 23 which sense the liquid level in it and control the operation of the pump 18. A further electrical sensor 24 controls, by means of the valve 25, the liquid flow (hot water) circulating through the coil 14. In the embodiment of FIG. 2, the vessel 13 is provided with a porous or sponge material filling divided into three zones: the upper zone, or rectification zone, possesses a filling 26 of low-density sponge material located in the top part of the generator 3 and able to retain the liquid droplets entrained by the vapour; the lower zone, for collecting the concentrated liquid, possesses a filling 27 of high-density sponge material; and the middle zone, or distillation zone, possesses a filling 28 of very high-density sponge material.

The sponge-like material fillings 10, 26, 27 and 28 used inside the absorber 2 and the vapour generator 3 have the purpose of preventing abrupt displacement of the refrigerant and absorbent fluids in solution by subdividing the solution into an extremely large number of small portions or micro-cells. The solution, subdivided in this way, contacts an appreciably larger surface area; friction forces deriving from these contacts are in this way much greater and retard the displacement of the individual solution portions which would otherwise occur as a result of movements of the vehicle in which the refrigeration system is installed. In this regard, the sponge filling 26 operates as a rectification unit, avoiding the possibility that drops of absorbing fluid or undistilled refrigerating fluid might enter into the vapour conduit 19 as a consequence of the shocks caused by the motion of the vehicle. Moreover, the large increase of the contact surfaces provided by the sponge-like material fillings 10, 26, 27 and 28 greatly improves thermal exchanges in the system.

The condenser 4 is coupled to the cooling radiator 29 for the engine cooling liquid of the circuit 15, which is circulated by the pump 30. The condenser 4 consists of a radiator 31 which can be cooled by the same electrically driven fan 32 as the radiator 29, or alternatively can possess its own electrically driven fan 33, the operation of which is controlled by a sensor 34 which senses the temperature at the outlet of the radiator 31.

The evaporator 5 consists of a heat exchanger 35 fed with the fluid from the pressure reduction valve 6, and is provided with an electrically driven fan 36 for adjusting the required throughput of cooled air.

An electrical sensor 37, acting on the valve 25, prevents ice formation on the heat exchanger 35. A condensate collector 38 is provided below the heat exchanger 35.

In this case, the evaporator 5 can be the actual heat exchanger provided in the vehicle for internal heating. The system according to the invention can be set to either cool the air entering the vehicle passenger compartment or heat it. For this purpose, a three-way valve 39 is provided at the outlet of the generator 3 to enable the system to be set to heating or cooling.

The system circuit contains a solution or mixture of fluids, one of which is the absorbent fluid and the other is the refrigerant fluid for the system.

The absorbent fluid consists of a liquid able to dissolve and absorb the vapour formed by the refrigerant fluid. The refrigerant fluid is a substance able to undergo the changes of state required by the thermodynamic cycle used, under the temperature and pressure conditions prevailing in the system. By way of example, the solution used can be a solution of LiBr in water, in which the refrigerant fluid is water and the absorbent fluid is a concentrated solution of LiBr in water, or can be a solution of $NH_3$ in water, in which the refrigerant fluid is $NH_3$, or again can be a ternary solution of $NH_3$, $H_2O$ and $H_2$.

The operating cycle of the apparatus is as follows, described with reference to the use of an aqueous solution of LiBr.

The coil 14, through which the engine cooling water flows, boils the dilute LiBr solution in the generator 3 to produce water vapour which flows in the direction of the arrows $F_1$ in the vapour pipe 20 to reach the condenser 4, where it condenses by giving up heat to the outside. The water then passes through the pressure reduction valve 6 to reach the evaporator 5 where, because of its low pressure, it evaporates to subtract its latent heat of evaporation from the external environment, thus producing the required cold.

The low pressure in the evaporator 5 is maintained by virtue of the absorption of the water vapour from the evaporator 5 by the concentrated LiBr solution fed through the pipe 12 from the lower zone of the generator 3.

The thus diluted solution is then again fed to the generator 3 by the pump 18, which is of small capacity, to be again subjected to distillation to again produce the water vapour necessary for the cycle.

In this manner, the evaporator 5 operates as a cooler for the air fed into the vehicle passenger compartment. If instead of cooling, the heat exchanger 35 is to be used to heat the vehicle interior, the valve 39 is switched over to feed the vapour stream produced by the generator 3 to the branch 40 of the circuit in accordance with the arrow $F_2$, so as to exclude its passage through the heat exchanger 31 and pressure reduction valve 6.

In this manner, the heat exchanger 35 receives water vapour, the heat of which has been provided by the cooling water of the engine 1 by way of the coil 14, so enabling the required heating to be obtained.

Figure 3:
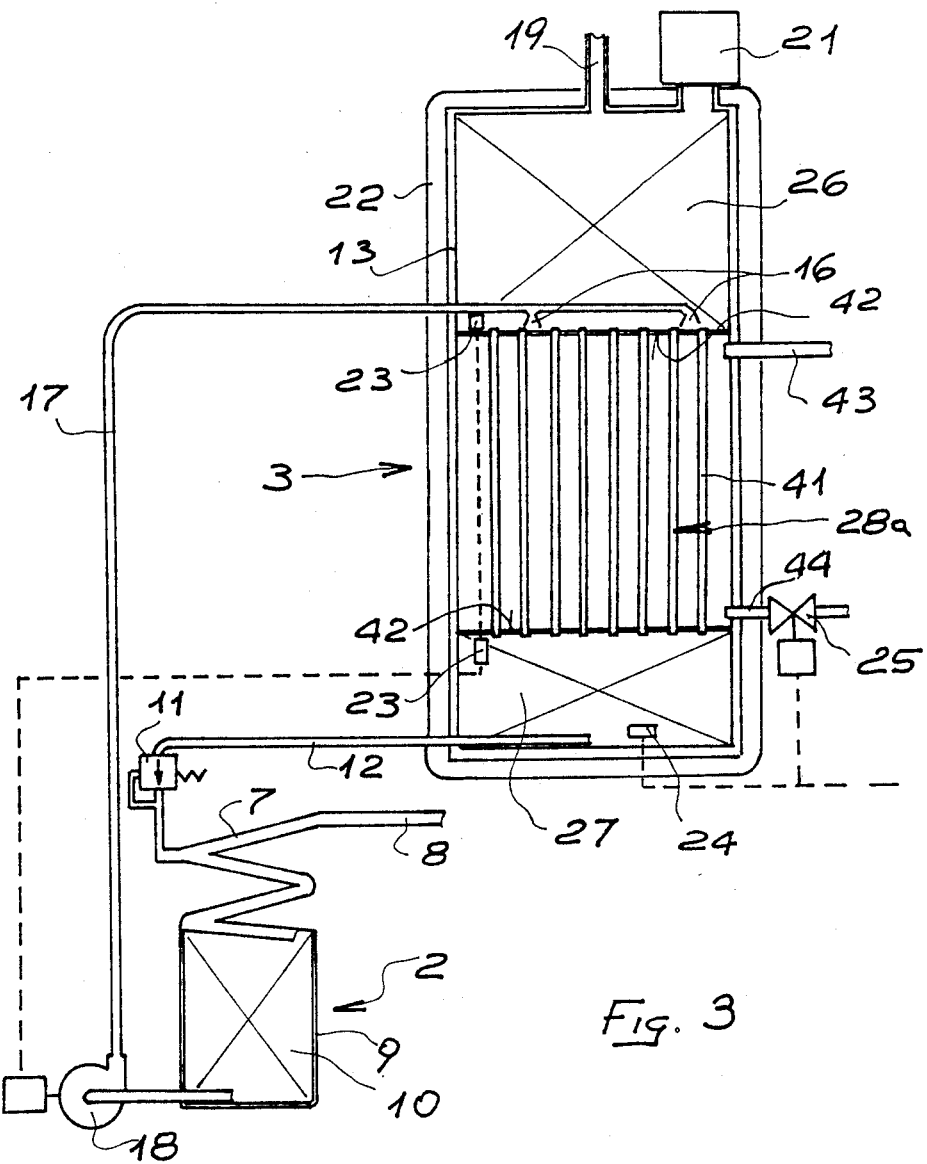
FIG. 3 shows an alternative embodiment of the vapour generator member.

FIG. 3 shows an alternative embodiment of the vapour generator member, which comprises, as replacement for the coil 14 and filling 28 of very high-density sponge material, a tube bundle 28a formed from a plurality of small diameter tubes 41 of vertical axis, parallel to the axis of the vessel 13, and carried by the tube plates 42.

The bundle of small diameter tubes 28a function in a manner similar to the sponge-like material filling 28 in the embodiment of the invention shown in FIG. 2, to prevent abrupt displacement of the refrigerant fluid in solution as a result of movements of the vehicle, by providing an appreciable increase in the contact surface area engaged by the refrigerant, with a consequent increase in the resistance of the refrigerant to motion and an improvement in thermal exchange between the refrigerant and the tubes.

The engine cooling fluid is fed through the pipes 43, 44 so as to flow around the outside of the tubes 41, which provide the necessary surface for heat transfer and within which the distillation of the refrigerant fluid takes place. The welding of the tube plates 42 can be carried out under low voltage because of the low operating temperatures and pressures of the system, and is therefore economically convenient. The tube bundle also provides a large heat transfer surface and ensures uniform distribution of the descending liquid stream over the entire cross-section of the vessel 13, so making this embodiment particularly convenient.

The pump 18 impresses on the solution the necessary head, so that the solution overcomes the resistance to motion caused by the sponge fillings 10 and 27, and the sponge filling 28 or the bundle of tubes 28a, and moves in the proper direction and with a flow rate adequate for obtaining correct operation. The spray nozzles 16 have the purpose of distributing evenly the solution in all the cavities of the sponge filling 28, or in the tubes of the bundle of tubes 28a; in this way, the vapour generator 3 is homogeneously filled without accumulation or depletion areas for the solution, even when the system is mounted on a moving vehicle.

In summary, with reference to FIGS. 2 and 3, the use of the sponge material fillers 10, 27 and 28 in the absorber 2

Figure 4:
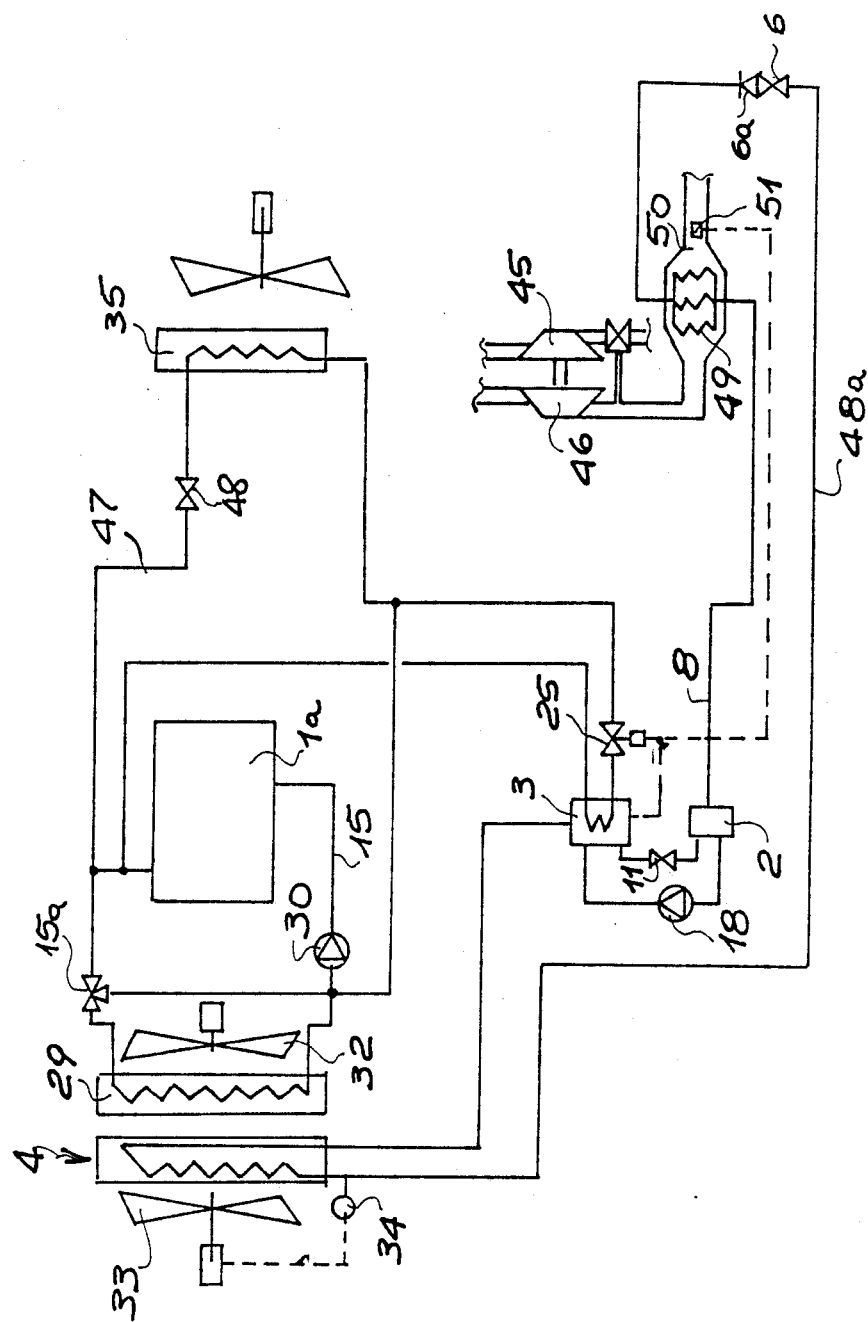
FIG. 4 is a circuit diagram of the refrigeration system used for cooling the intake air of a supercharged engine.

FIG. 4 shows the system according to the invention used for cooling the intake air of a supercharged engine 1a with a turbine 45 driven by the engine exhaust gas, and a combustion air compressor 46.

The engine cooling fluid circuit 15 is analogous to that described heretofore and is of normal construction, comprising a branch 47 containing the regulator valve 48 controlled from the vehicle interior, for feeding the engine cooling fluid to the heat exchanger 35 for the internal heating of the vehicle.

The refrigerant fluid is fed from the condenser to the pressure reduction valve 6 through the pipe 48a and then to the heat exchanger 49 or evaporator, disposed in the combustion air intake duct 50. The refrigerant fluid is fed from the heat exchanger 49 to the absorber 2 through the pipe 8, in an analogous manner to that described heretofore.

A temperature sensor 51 disposed in the combustion air intake duct controls the valve 25 which regulates the flow of engine cooling liquid into the generator 3, so allowing the temperature of the air fed to the compressor 46 to be controlled in relation to the external environmental characteristics.

Controlling the supercharging air temperature enables an increase in engine efficiency to be obtained, by attaining constant optimum conditions of the combustion air fed to the cylinders for combustion purposes, independently of the external pressure and temperature conditions and the supercharging pressure.

Many modifications can obviously be made to the system according to the invention, but without leaving the scope of protection of the invention itself.

What is claimed is:

1. An absorption-type vehicle refrigeration system with thermal energy recovery, for vehicles provided with an internal combustion engine having a cooling system containing an engine cooling liquid, comprising a vapour generator connected to a condenser which is itself connected, by way of a pressure reduction valve, to an evaporator connected to an absorber which receives liquid present in a lower zone of the generator and from which the liquid is fed to an upper zone of the generator, there being provided in the generator a heat exchanger connected to the engine cooling system and through which the engine cooling liquid flows, the engine cooling liquid flowing through the heat exchanger constituting the primary source of heat for operating the generator, the generator and absorber containing a refrigerant fluid and an absorbent fluid, the absorbent fluid being able to absorb or dissolve the refrigerant fluid, which can itself be distilled or separated from the absorbent fluid by the addition of heat which is supplied to the generator by the heat exchanger in the generator, and be condensed and vaporised under the temperature and pressure conditions prevailing in the condenser and evaporator, respectively, and the absorber and the generator including means for precluding displacement of the absorbent fluid and the refrigerant fluid from respective portions of the refrigeration system as a result of vehicle movements so as to cause consequent inversion of the system operating cycle.

2. A refrigeration system according to claim 1, wherein the vapour generator comprises a vertical vessel which contains the heat exchanger through which the engine cooling liquid flows, said fluid displacement precluding means provides a large thermal mass transfer surface area, and the vertical vessel includes an upper part from which a pipe feeds vapour generated in the vertical vessel by distillation of the mixture or solution of refrigerant fluid and absorbent fluid to the condenser, whereas from a lower part of the vessel a pipe provided with a pressure reduction valve feeds the liquid in the lower zone to the absorber, there being also provided means for distributing liquid originating from the absorber over the heat exchanger.

3. A refrigeration system according to claim 2, wherein the fluid displacement precluding means providing a large thermal mass transfer surface area in the vapour generator comprises a filling of low-density sponge material provided in the upper part of the vessel and a filling of high-density sponge material provided in the lower part of the vessel.

4. A refrigeration system according to claim 1, wherein the absorber comprises a coil which is connected to a pipe originating from the evaporator and leads to a collection receiver, there also opening into the coil the pipe which feeds the liquid from the lower part of the vapour generator, there being provided in the lower zone of the collection receiver a pipe which by means of a pump controlled by means for sensing the liquid level in the generator, feeds the liquid contained in the receiver to the means for distributing the liquid over the heat exchanger in the vapour generator, there being also provided in the upper an part of the vessel a connector provided with a valve for the introduction of the fluids and for the production and maintenance of the internal operating pressure.

5. A refrigeration system according to claim 1, wherein the heat exchanger provided in the vapour generator comprises a coil through which the vehicle engine cooling liquid flows and which is immersed in a filling of very high-density sponge material forming part of the fluid displacement precluding means.

6. A refrigeration system according to claim 1, wherein the heat exchanger provided in the vapour generator comprises a tube bundle comprising vertical tubes contained in the vessel and forming part of the fluid displacement precluding means, the solution or mixture of absorbent fluid and refrigerant fluid passing through the inside of the tubes, while the engine cooling liquid passes around the outside of the tubes.

7. A refrigeration system according to claim 1, wherein the evaporator comprises a heat exchanger operated by an electrically driven fan and disposed in a duct which feeds air to the interior of the vehicle passenger compartment, there being connected into the pipe leaving the generator and leading to the condenser a three-way valve which can be controlled from the vehicle interior in order to feed the vapour generated in the generator to the evaporator downstream of the pressure reduction valve.

8. A refrigeration system according to claim 7, wherein the evaporator is the actual heat exchanger for the internal heating of the vehicle passenger compartment.

9. A refrigeration system according to claim 1, wherein the evaporator comprises a heat exchanger disposed in a combustion air intake duct of a supercharged engine, upstream of the compressor, in order to cool the intake air, thus increasing the compression efficiency.

10. A refrigeration system according to claim 1, wherein the vapour generator is provided in its lower zone with a liquid level sensor acting on a valve for controlling the flow of engine cooling liquid through the heat exchanger in the generator.

11. A refrigeration system according to claim 10, wherein the evaporator is provided with a temperature sensor acting on the valve which controls the flow of engine cooling liquid through the heat exchanger in the generator.

12. A refrigeration system according to claim 10, wherein a temperature sensor is provided in a combustion air intake duct upsteam of the heat exchanger, to act on the valve controlling the engine cooling liquid flow through the heat exchanger in the generator.

13. A refrigeration system according to claim 1, wherein the mixture or solution of absorbent fluid and refrigerant fluid consists preferably of a solution of LiBr in water, $NH_3$ in water, or a solution of $NH_3$, $H_2O$ and $H_2$.

14. An absorption-type vehicle refrigeration system with thermal energy recovery, according to claim 1, wherein the system is for vehicles provided with an internal combustion supercharged engine having a cooling system containing an engine cooling liquid, and having a combustion air intake duct and a combustion air compressor, and wherein the evaporator comprises a second heat exchanger disposed in the combustion air intake of the supercharged engine upstream of the combustion air compressor, in order to cool the intake air and thereby increase the compression efficiency.

* * * * *